United States Patent
Kim et al.

(10) Patent No.: US 12,487,571 B2
(45) Date of Patent: Dec. 2, 2025

(54) SYSTEM AND METHOD FOR STATUS DIAGNOSIS OF CONSTRUCTION MACHINERY

(71) Applicant: HD HYUNDAI INFRACORE CO., LTD., Incheon (KR)

(72) Inventors: Keon Kim, Incheon (KR); Wonjong Lim, Incheon (KR); Doyoun Kim, Incheon (KR); Daeho Kim, Incheon (KR)

(73) Assignee: HD HYUNDAI INFRACORE CO., LTD., Incheon (KR)

( * ) Notice: Subject to any disclaimer, the term of this patent is extended or adjusted under 35 U.S.C. 154(b) by 359 days.

(21) Appl. No.: 17/993,386

(22) Filed: Nov. 23, 2022

(65) Prior Publication Data

US 2023/0161310 A1  May 25, 2023

(30) Foreign Application Priority Data

Nov. 23, 2021 (KR) .......................... 10-2021-0162753

(51) Int. Cl.
*G05B 19/042* (2006.01)

(52) U.S. Cl.
CPC .. *G05B 19/042* (2013.01); *G05B 2219/37228* (2013.01)

(58) Field of Classification Search
USPC ........................................................ 700/175
See application file for complete search history.

(56) References Cited

U.S. PATENT DOCUMENTS

| 6,644,095 B2 * | 11/2003 | Van Mullekom ...... F01M 11/06 73/10 |
| 2010/0070130 A1 * | 3/2010 | Suzuki .................... E02F 9/268 701/33.4 |

(Continued)

FOREIGN PATENT DOCUMENTS

| EP | 1471216 A2 | 10/2004 |
| EP | 2416140 A1 | 2/2012 |

OTHER PUBLICATIONS

Zhu, Xiaoliang, Chong Zhong, and Jiang Zhe. "Lubricating oil conditioning sensors for online machine health monitoring—A review." Tribology International 109 (2017): 473-484. (Year: 2017).*

(Continued)

*Primary Examiner* — Mohammad Ali
*Assistant Examiner* — Joshua T Sanders
(74) *Attorney, Agent, or Firm* — K&L Gates LLP

(57) ABSTRACT

Disclosed is a system for status diagnosis of construction machinery. The system for status diagnosis of the construction machinery to determine the abnormality of the construction machinery may include a sensor unit including at least one or more oil property sensors for detecting oil property information and at least one or more equipment sensors for detecting operating status information, a control unit configured to determine a basic status of the construction machinery through the oil property information and determine an overall status of the construction machinery by reflecting the operating status information of the construction machinery based on the basic status of the construction machinery, and a display unit configured to display a notification according to the determination of the control unit.

8 Claims, 4 Drawing Sheets

(56) References Cited

U.S. PATENT DOCUMENTS

2016/0010313 A1    1/2016  Sugiura et al.
2020/0201292 A1*   6/2020  Cella ................. G05B 19/4155
2022/0282455 A1*   9/2022  Kurasako ................ E02F 9/267

OTHER PUBLICATIONS

Durdag, Kerem, and Jeff Andle. "Real-time viscosity measurement for condition-based monitoring using solid-state viscosity sensor." Tribology Transactions 51.3 (2008): 296-302. (Year: 2008).*
Extended European Search Report for related European Application No. 22208700.9; action dated Apr. 14, 2023; (7 pages).

* cited by examiner

SYSTEM AND METHOD FOR STATUS DIAGNOSIS OF CONSTRUCTION MACHINERY

CROSS-REFERENCE TO RELATED APPLICATIONS

This application claims benefit and priority to Korean Patent Application No. 10-2021-0162753 filed on Nov. 23, 2021 with the Korean Intellectual Property Office, the disclosure of which is incorporated herein in its entirety by reference.

FIELD

The present disclosure relates to a system and a method for status diagnosis of construction machinery.

BACKGROUND

Construction machinery, such as excavators, wheel loaders, and dozers, is mainly used at construction sites, and at the construction sites, there may be a significant difference in total construction cost depending on a construction period. For this reason, in order to comply with the preset construction period, the construction machinery needs to operate stably.

In addition, since construction machinery itself is more expensive than a general passenger vehicle, it is very important to diagnose the status before the failure of the machinery occurs and prevent the failure.

SUMMARY

The present disclosure has been made in an effort to provide a system and a method for status diagnosis of construction machinery capable of preventing a failure by diagnosing the status of the machinery in advance before the failure of the construction machinery occurs.

An exemplary embodiment of the present disclosure provides a system for status diagnosis of construction machinery to determine the abnormality of the construction machinery including a sensor unit including at least one or more oil property sensors for detecting oil property information and at least one or more equipment sensors for detecting operating status information, a control unit configured to determine a basic status of the construction machinery through the oil property information and determine an overall status of the construction machinery by reflecting the operating status information of the construction machinery based on the basic status of the construction machinery, and a display unit configured to display a notification according to the determination of the control unit.

Preferably, the operating status information of the construction machinery detected through the equipment sensor may include a first factor including operating time information, operating condition information, and parts maintenance information of the construction machinery and a second factor including operating specification information of the construction machinery by the change in the properties of the oil.

Preferably, the control unit may reflect the operating status information of the construction machinery to determine the overall status of the construction machinery by giving a preset weight to each of the first factor and the second factor.

Preferably, the weight given to the second factor may be higher than the weight given to the first factor.

Preferably, the oil property sensor may acquire the oil property information at a preset cycle, and the second factor may be acquired at the same cycle as the cycle at which the oil property information is acquired.

Preferably, the basic status of the construction machinery may be determined based on kinematic viscosity or permittivity for each temperature section of the oil.

Another exemplary embodiment of the present disclosure provides a method for status diagnosis of construction machinery to determine the abnormality of the construction machinery including the steps of: acquiring oil property information and operating status information at a preset cycle; determining a basic status of the construction machinery based on the oil property information; determining an overall status of the construction machinery by reflecting the operating status information based on the basic status of the construction machinery; and displaying a notification according to the overall status of the construction machinery.

Preferably, the operating status information may include a first factor including operating time information, operating condition information, and parts maintenance information of the construction machinery and a second factor including operating specification information of the construction machinery by the change in the properties of the oil, and the overall status of the construction machinery may be determined by giving a preset weight to the first factor and the second factor, respectively.

According to the exemplary embodiments of the present disclosure, it is possible to determine an oil status of the construction machinery even without a separate off-line operator action.

In addition, it is possible to enhance the accuracy of determination of an abnormal status by combining an oil status of the machinery and an operating status of the machinery to determine the overall status of the construction machinery.

The foregoing summary is illustrative only and is not intended to be in any way limiting. In addition to the illustrative aspects, embodiments, and features described above, further aspects, embodiments, and features will become apparent by reference to the drawings and the following detailed description.

DETAILED DESCRIPTION

Figure 1:
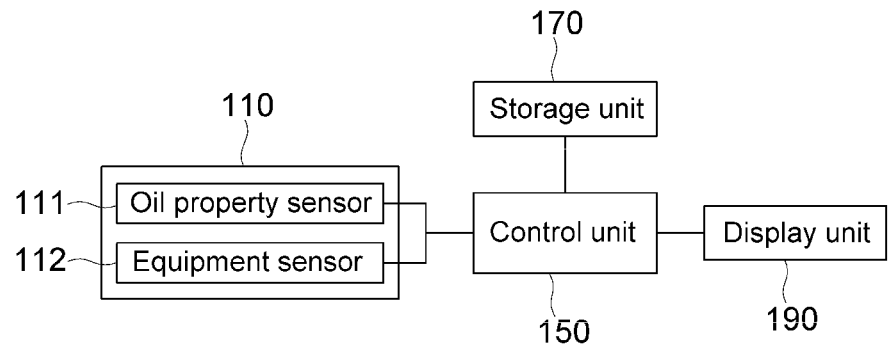
FIG. 1 is a block diagram schematically illustrating a relationship between components of a system for status diagnosis of construction machinery according to various exemplary embodiments of the present disclosure.

In the following detailed description, reference is made to the accompanying drawing, which forms a part hereof. The illustrative embodiments described in the detailed description, drawing, and claims are not meant to be limiting. Other embodiments may be utilized, and other changes may be made, without departing from the spirit or scope of the subject matter presented here.

Hereinafter, some exemplary embodiments of the present disclosure will be described with reference to illustrative drawings for convenience of description. In describing the reference numerals for components of each drawing, the same components are denoted by the same reference numerals as much as possible even though they are indicated on different drawings.

Terms and words used in the present specification and claims should not be interpreted as being limited to typical or dictionary meanings, but should be interpreted as meanings and concepts which comply with the technical spirit of the present disclosure, based on the principle that the present inventor can appropriately define the concepts of the terms to describe his/her own disclosure in the best manner. In describing the components of the exemplary embodiments of the present disclosure, terms including first, second, A, B, (a), (b), and the like may be used. These terms are just intended to distinguish the components from other components, and the terms do not limit the nature, sequence, or order of the components. When it is disclosed that any component is "connected", "coupled", or "linked" to other components, it should be understood that the component may be directly connected or linked to other components, but another component may be "connected", "coupled", or "linked" between the respective components.

Accordingly, configurations illustrated in the drawings and exemplary embodiments disclosed in the present specification are only the most preferred exemplary embodiment of the present disclosure and do not represent all of the technical spirit of the present disclosure, and thus it is to be understood that various equivalents and modifications, which may replace the configurations, are possible when filing the present application. Further, the detailed description of publicly-known function and configuration that may make the gist of the present disclosure unnecessarily ambiguous will be omitted.

Figure 2:
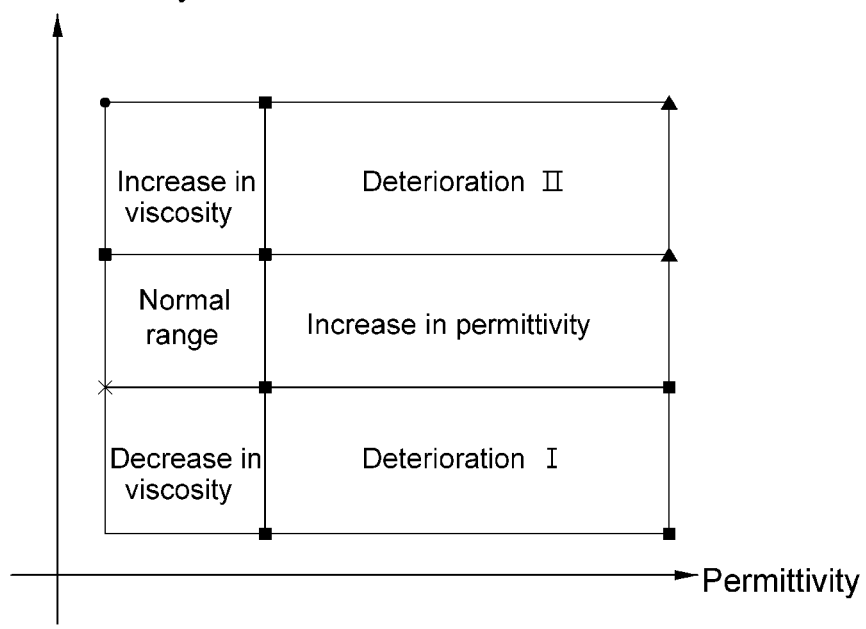
FIG. 2 is an oil status check map using preset position coordinates for primary classification of the oil status based on kinematic viscosity and permittivity.
Figure 3:
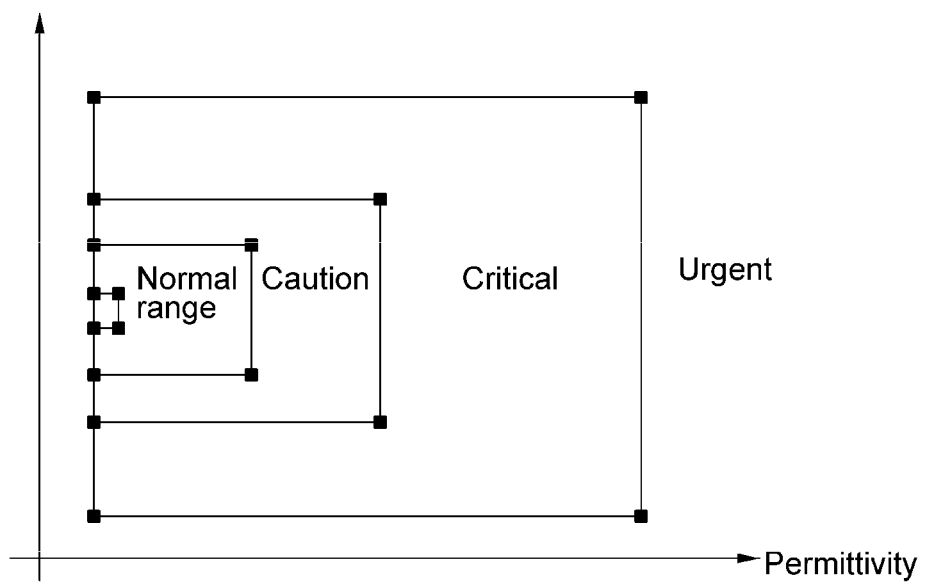
FIG. 3 is an oil status check map for secondarily classifying an oil status based on a result of primary classification using a graph of FIG. 2.
Figure 4:
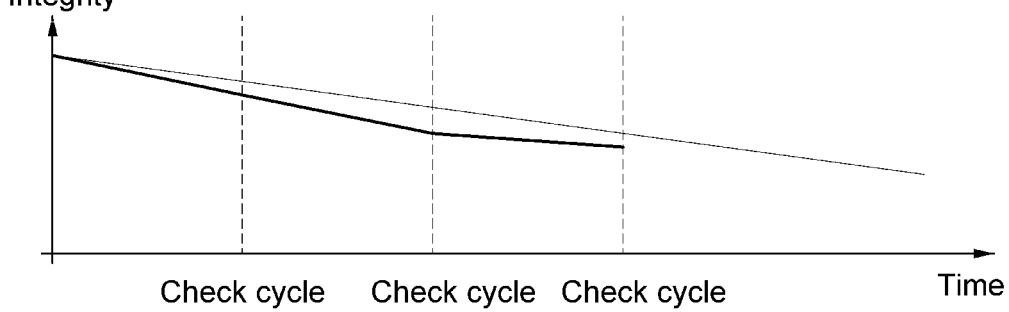
FIG. 4 is a basic life diagram illustrating operating time information (mileage) of a first factor of operating status information of the construction machinery.
Figure 5:
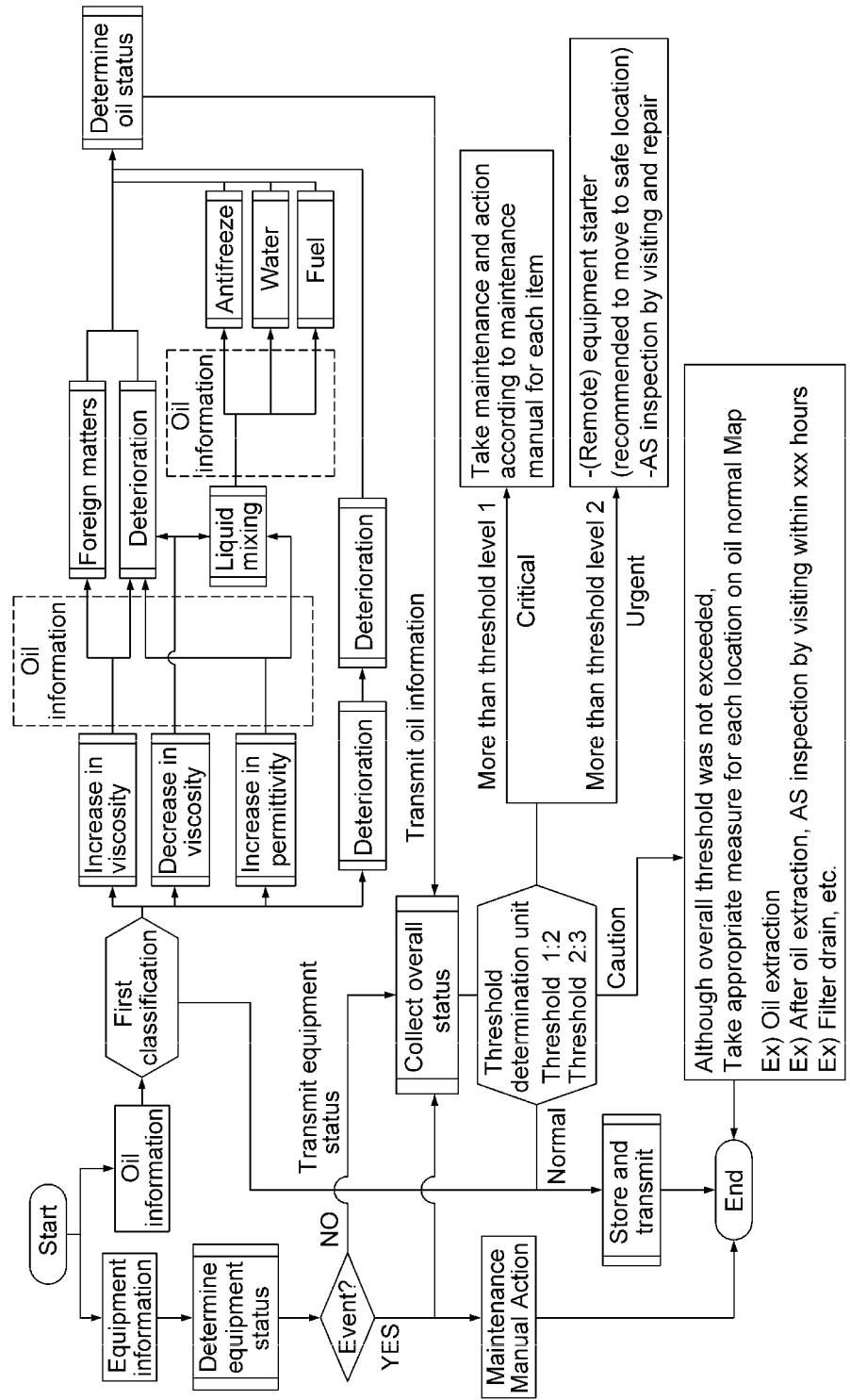
FIG. 5 is a flowchart schematically illustrating a method for status diagnosis of construction machinery according to various exemplary embodiments of the present disclosure.
Figure 6:
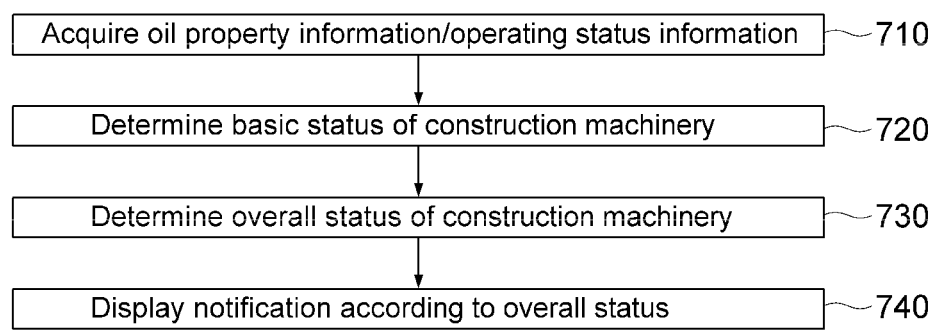
FIG. 6 is a flowchart illustrating a method for status diagnosis of construction machinery according to various exemplary embodiments of the present disclosure.

FIG. 1 is a block diagram schematically illustrating a relationship between components of a system for status diagnosis of construction machinery according to various exemplary embodiments of the present disclosure, FIG. 2 is an oil status check map using preset position coordinates for primary classification of the oil status based on kinematic viscosity and permittivity, FIG. 3 is an oil status check map for secondarily classifying an oil status based on a result of primary classification using a graph of FIG. 2, FIG. 4 is a basic life diagram illustrating operating time information (mileage) of a first factor of operating status information of the construction machinery, FIG. 5 is a flowchart schematically illustrating a method for status diagnosis of construction machinery according to various exemplary embodiments of the present disclosure, and FIG. 6 is a flowchart illustrating a method for status diagnosis of construction machinery according to various exemplary embodiments of the present disclosure.

Hereinafter, a system for status diagnosis of construction machinery according to various exemplary embodiments of the present disclosure will be described in detail with reference to FIGS. 1 to 4.

Referring to FIG. 1, a system for status diagnosis of construction machinery according to various exemplary embodiments of the present disclosure includes a sensor unit 110, a storage unit 170, a control unit 150, and a display unit 190.

The sensor unit 110 may include an oil property sensor 111 for detecting oil property information and an equipment sensor 112 for detecting operating status information.

The oil property sensor 111 may be installed on all oil flow paths used in hydraulically driven construction machinery. At least one or more oil property sensors 111 may be provided. The oil property sensor 111 may detect information about oil, that is, information about the property and status of current oil. The information about the oil may be acquired according to a regular cycle. In the present disclosure, the viscosity, density, dielectric constant, temperature, and oil usage time of the oil may be detected through at least one oil property sensor 111, but the present disclosure is not limited thereto. The information about the oil acquired through the oil property sensor 111 may be stored in the storage unit 170. In the present disclosure, the oil is described based on hydraulic oil of the construction machinery. However, the present disclosure is applicable to other oils used in construction machinery, such as engine oil and gear oil.

In addition, the control unit 150 calculates secondary information such as the kinematic viscosity of the oil based on the information about the oil acquired through the oil property sensor 111, and the calculated secondary property information may be stored in the storage unit 170. In this way, the oil status of the construction machinery may be determined through the oil property information or the secondary information of the oil stored in the storage unit 170. The oil status may be scored and graded by the control unit 150 like the above-described equipment status. In an exemplary embodiment, the oil status may be scored and graded based on kinematic viscosity, permittivity, an oil usage time, and a temperature of the oil.

According to an exemplary embodiment, the primary classification of the oil status may be performed based on the position in the preset coordinates as illustrated in FIG. 2. An X axis of FIG. 2 may be permittivity of the oil obtained by the oil property sensor 111, and a Y axis may be the kinematic viscosity of the oil calculated by the control unit 150. In an exemplary embodiment, the primary classification of the oil status may be classified into an increase in viscosity, a decrease in viscosity, deterioration I, deterioration II, and an increase in permittivity as illustrated in FIG. 2 based on the kinematic viscosity and permittivity of the oil.

In the present disclosure, the deterioration I relates to deterioration of oil over time when there is no mechanical failure due to normal use of the construction machinery, and with the passage of time, a molecular structure of the oil is broken by mechanical friction or shear, and the viscosity decreases, and the permittivity increases due to oxidation products.

Deterioration II relates to deterioration due to contamination of oil caused by abnormal factors (mechanical failure, mixing of foreign matters, etc.), and in the initial properties of the oil, the production of oxidation products is accelerated, so that the viscosity increases and the permittivity increases due to the formation of sludge in the form of a polymer.

Referring to FIG. 5, thereafter, detailed classification may be made based on information about oil. In an exemplary embodiment, as the primary classification result, according to a change in kinematic viscosity and/or a change in absolute value of the permittivity and a change in permittivity, detailed classification of the oil status such as foreign substances, deterioration I, liquid mixing (antifreeze, water, and fuel), deterioration II may be performed.

In an exemplary embodiment, as the primary classification result, when the result is classified as a section of deterioration I or deterioration II in FIG. 2, the abnormality cause of the oil may be determined as a flow (deterioration I) of each normal operating time or a mechanical failure, mixing of foreign matters (deterioration II), etc., respectively.

In an exemplary embodiment, when the first classification result is classified as the viscosity increasing section of FIG. 2, the abnormality cause of the oil may be determined as the mixing of foreign matters or deterioration II. In an exemplary embodiment, when the first classification result is classified as the viscosity decreasing section of FIG. 2, the abnormality cause of the oil may be determined as the mixing of liquids or deterioration I. In an exemplary embodiment, when the first classification result is classified as the permittivity increasing section of FIG. 2, the abnormality cause of the oil may be determined as the mixing of liquids or deterioration I and II.

an exemplary embodiment, the oil status grade may be determined based on a range in which the kinematic viscosity of current oil calculated by the control unit 150 is changed compared to the initial value. In an exemplary embodiment, when the kinematic viscosity or permittivity of the current oil is within a first threshold compared to the initial value, it may be determined as a normal grade, and when the kinematic viscosity or permittivity of the current oil exceeds the first threshold and is within a second threshold, it may be determined as a caution grade. In addition, when the kinematic viscosity or permittivity of the current oil exceeds the second threshold and is within a third threshold, it may be determined as a critical grade, and when the kinematic viscosity or permittivity of the current oil exceeds the third threshold and is within a fourth threshold, it may be determined as an urgent grade. In this case, the caution, critical, and urgent grades may be determined as abnormal grades out of the normal range.

In addition, when the oil usage time exceeds a preset replacement cycle, it may be classified as a caution grade, and even when the temperature of the oil exceeds a preset temperature range compared to an average operating temperature range for a preset time or more, it may be classified as a caution grade.

TABLE 1

| | | | Oil status score | | | | |
|---|---|---|---|---|---|---|---|
| Equipment | Equipment operating time | Event | Permittivity [%] | Kinematic viscosity [%] | First classification [Zone] | Second classification [Determination] | Grade |
| A | 2000 | ○ | — | — | — | — | — |
| B | 2000 | X | 0 | 0 | Within 5% normal | Normal | normal |
| C | 2000 | X | 3 | 14 | Increase in viscosity | Foreign matters | caution |
| D | 5000 | X | 17 | 10 | Deterioration 2 | Deterioration | critical |
| E | 5700 | X | 14 | −9 | Deterioration | Deterioration | critical |
| F | 5000 | X | 6 | 7 | Deterioration2 | Deterioration | caution |
| G | 1500 | X | 19 | 5 | Increase in permittivity | Liquid mixing | critical |
| H | 500 | X | 0 | −14 | Decrease in viscosity | Fuel mixing | critical |
| I | 4500 | X | 9 | −16 | Deterioration | Deterioration | critical |

In an exemplary embodiment of the present disclosure, in the case of a process of determining a status of engine oil, when it is determined that the abnormality cause of the oil is liquid mixing, the mixed liquid may be more specifically classified as antifreeze, water, and fuel based on the information about the oil. In an exemplary embodiment, in the case of the liquid mixing, the fuel may be classified according to whether the permittivity in engine oil increases rapidly, the antifreeze may be classified according to whether the degree of the increase in permittivity in engine oil less increases than that of the fuel, but is absolutely greater than that of deterioration, and the water may be classified according to whether the permittivity in the hydraulic oil increases rapidly.

Referring to FIGS. 3 and 5, thereafter, based on the primary classification result, the status of oil may be determined by secondary classification through additional information such as an increase rate and an increase width. In an exemplary embodiment, the secondary classification may be made through an amount of change to an initial value of the kinematic viscosity or permittivity of the oil. In addition, such secondary classification may be calculated based on temperature-specific kinematic viscosity or permittivity. In

[Table 1] shows grading of an oil status for each equipment in [Table 2] below.

As described above, the basic status of the construction machinery may be determined through the grade of the oil status determined based on the oil property information.

According to the present disclosure, it is possible to improve the accuracy of the diagnosis by diagnosing the overall status of the construction machinery by reflecting the grade of the equipment status determined based on the operating status of the construction machinery to be described below based on the basic status of the construction machinery.

The equipment sensor 112 may be installed in an engine and/or hydraulic system of the construction machinery to detect operating status information according to the operation of the construction machinery. The equipment sensor 112 may detect information of each component according to the operation of the construction machinery. The equipment sensor 112 may detect information about the engine according to the driving of the construction machinery. For example, information about the number of revolution, load, coolant temperature, etc. of the engine may be acquired through the equipment sensor. In addition, the equipment sensor 112 may detect information about a hydraulic system according to driving of the construction machinery, for example, a hydraulic pump, a control valve, a hydraulic motor, and/or a gearbox. For example, information about a flow rate of a hydraulic pump, an operation profile of a main control valve, and the like may be acquired through the equipment sensor 112.

According to various exemplary embodiments of the present disclosure, the operating status information of the construction machinery detected through the equipment sensor 112 may include a first factor including operating time information (mileage), operating condition information (usage history), and parts maintenance information (maintenance) of the construction machinery and a second factor including operating specification information (usage check) of the construction machinery by the change in the properties of the oil. The operating status information of the construction machinery detected through the equipment sensor 112 may be stored in the storage unit 170.

an abrupt performance change in the vehicle in accordance with an acquisition cycle for acquiring the property information of oil through a sensor to the overall vehicle status. Alternatively, when an abrupt abnormal point occurs when acquiring the above-described first factor information, the second factor may be a factor for reflecting the abnormal point to the overall vehicle status. In the present disclosure, it is possible to determine whether the equipment is damaged by the oil through the second factor, and whether there is an abnormality that cannot be confirmed or is not confirmed when the oil property is determined by the oil sensor in terms of the vehicle. In the present disclosure, the oil property sensor 111 may acquire the oil property information at a preset cycle, and the second factor may be acquired at the same cycle as the cycle at which the oil property information is acquired.

The operating status information of such construction machinery may be scored and graded by the control unit 150 as shown in [Table 2].

TABLE 2

| | | | | First factor | | | | | | | |
|---|---|---|---|---|---|---|---|---|---|---|---|
| | Equipment | | | | Usage History | | | | | First factor | Second factor |
| | operating | | Mileage | | Hydraulic | Engine | Rotational | | Maintenance | | |
| Equipment | time | Event | Time | Environment | (thermal) | (heat) | speed | Load | Score | Score Results | Score Results |
| A | 2000 | ○ | | | | | | | | AS | |
| B | 2000 | X | 8 | 3 | 5.0 | 5.0 | 5.0 | 5.0 | 10 | 49.4 Good | 48.2 Check |
| C | 2000 | X | 8 | 2 | 4.6 | 5.6 | 6.1 | 6.1 | 10 | 48.5 Good | 48.2 Check |
| D | 5000 | X | 5 | 3 | 6.0 | 6.9 | 3.8 | 5.7 | 9 | 47.2 Good | 47.3 Check |
| E | 5700 | X | 4.3 | 3 | 4.9 | 5.6 | 6.4 | 6.0 | 11 | 49.7 Good | 49.3 Good |
| F | 5000 | X | 5 | 2 | 5.4 | 5.7 | 5.2 | 4.9 | 10 | 43.5 Good | 48.8 Good |
| G | 1500 | X | 8.5 | 3 | 5.3 | 6.0 | 4.9 | 3.7 | 4 | 42.0 Caution | 47.7 Check |
| H | 500 | X | 9.5 | 1 | 4.1 | 5.7 | 6.0 | 5.4 | 12 | 47.1 Caution | 49.8 Good |
| I | 4500 | X | 5.5 | 2 | 5.7 | 6.0 | 4.9 | 3.6 | 10 | 42.8 Good | 47.7 Check |

In this case, the operating time information (mileage) of the first factor means a basic life diagram based on a driving time as shown in FIG. 4, and may mean a diagram (this is an item that has been verified for the life diagram during product development) linearly decreasing until the count becomes 0 based on a development life (or warranty life). In addition, in the case of performing equipment diagnosis from the middle of use, a separate correction value may also be used. The operating condition information (usage history) of the first factor is based on a main operating data, and for example, may include information about a usage load, a rotational speed, a pressure of each part, a temperature of each part, etc., in the engine, and information such as an engine rotation speed, a hydraulic discharge amount, a distribution amount of each part, a load of each part, and a work mode in a hydraulic device. The operating condition information follows various forms of a Weibull distribution for each specific time in the basic life diagram, and an offset is given to the basic life diagram. The part maintenance information (maintenance) of the first factor is information about parts maintenance, and may include information on a cycle of replacing consumables, etc. and whether genuine products are used, when the life of unit parts is reset due to partial replacement of parts when the equipment is used.

In addition, the operating specification information (usage check) as the second factor may include an element for reflecting the status of a vehicle related to the status of oil. According to various exemplary embodiments of the present disclosure, the second factor may be a factor for reflecting Referring to [Table 2], the score for the first factor may be calculated by summing the scores of each item constituting the first factor, such as operating time information, operating condition information, and parts maintenance information. In addition, a grade for the first factor may be determined for each predetermined section based on the score for the first factor. Here, it may be described that the grade for the first factor is divided into GOOD and CAUTION, but is not limited thereto.

Meanwhile, the score for the second factor may be calculated by checking abnormal points (e.g., increase/decrease rate, absolute value deviation, and/or performance deviation, etc.) for each acquisition cycle with respect to heat load, speed, and load. In addition, a grade for the second factor may be determined for each predetermined section based on the score for the second factor. Here, it may be described that the grade for the second factor is divided into GOOD and CHECK, but is not limited thereto.

In the present disclosure, the operating status information of the construction machinery is scored and graded as described above, and reflected in the basic status of the construction machinery based on the oil property information to determine the overall status of the construction machinery.

The storage unit 170 may store the oil property information detected through the oil property sensor 111. The storage unit 170 may store secondary property information such as the kinematic viscosity of oil calculated by the control unit 150 based on the information detected through the oil property sensor 111. In addition, the operating status information of the construction machinery detected through the equipment sensor 112 may be stored in the storage unit 170. The storage unit 170 may be provided inside the construction machinery. Alternatively, the storage unit 170 may be provided as a separate server outside the construction machinery to store information through wireless communication.

The control unit 150 may determine the overall status of the construction machinery based on the information acquired from the sensor unit 110. The control unit 150 may determine the basic status of the construction machinery based on the oil property information and/or the secondary property information of the oil acquired by the oil property sensor 111. The overall status of the construction machinery may be determined by reflecting the operating status information based on the determined basic status of the construction machinery.

According to various exemplary embodiments of the present disclosure, the basic status of the construction machinery may be determined based on the oil property information and/or the secondary property information such as kinematic viscosity of oil. The basic status of the construction machinery may be determined based on the status grade of the oil.

In an exemplary embodiment, [Table 3] illustrates results of determining the overall status of the construction machinery by reflecting the equipment status grade graded through the operating status information of the construction machinery to the basic status of the construction machinery, that is, the oil status grade graded through the oil property information.

TABLE 3

| Equipment | Equipment operating time | Part 1 Results | Score | Part 2 Results | Score | Oil Second classification [Determination] | Grade | Score | Evaluation Part_1 |
|---|---|---|---|---|---|---|---|---|---|
| A | 2000 | — | | — | | — | — | | — |
| B | 2000 | Good | 0 | Check | 0.6 | Normal | normal | 0 | Uniform use |
| C | 2000 | Good | 0 | Check | 0.6 | Foreign matters | caution | 1 | Good |
| D | 5000 | Good | 0 | Check | 0.6 | Deterioration | critical | 2 | High heat load |
| E | 5700 | Good | 0 | Good | 0 | Deterioration | critical | 2 | Good |
| F | 5000 | Good | 0 | Good | 0 | Deterioration | caution | 1 | Average level |
| G | 1500 | Caution | 0.5 | Check | 0.6 | Liquid mixing | critical | 2 | High speed and load |
| H | 500 | Caution | 0.5 | Good | 0 | Fuel mixing | critical | 2 | Good |
| I | 4500 | Good | 0 | Check | 0.6 | Deterioration | critical | 2 | High speed and load |

| Equipment | Evaluation Part_2 | Oil | Final grade Score | Grade | Note |
|---|---|---|---|---|---|
| A | — | — | — | — | Not determine score due to equipment failure |
| B | Check rotator | Normal | 0.6 | Normal | Normal operating equipment |
| C | Check rotator | Suspicion of wear/leakage | 1.6 | Caution | Caution because foreign matters are increased. Check history of excessive use of equipment as performance check result |
| D | Check rotator/hydraulic | Immediate oil change | 2.6 | Critical | Replacement is suspected due to oil deterioration, but from mileage, it is determined immediately after replacement, but wear of rotator is suspected. |
| E | Good | Oil check and filter replacement | 2.0 | Critical | When determined from mileage, oil non-replacement/ non-genuine/ mixing of different oils are suspected |

TABLE 3-continued

| | | | | | |
|---|---|---|---|---|---|
| F | Good | Oil check and filter replacement | 1.0 | Normal | When determined from mileage, oil non-replacement/ non-genuine/ mixing of different oils are suspected |
| G | Check system | Immediate filter replacement | 3.1 | Urgent | In Part 1, replacement cycle of consumables was very poor, and liquid mixing was suspected. |
| H | Good | Engine re-inspection (suspected of fuel mixing) | 2.5 | Critical | suspected of liquid mixing |
| I | Check rotator | Oil check and filter replacement | 2.6 | Critical | Overall, equipment is used under high loads (within normal range) Oil deterioration (suspected of non-exchange) |

Referring to [Table 3], the control unit 150 reflects the operating status information of the construction machinery to the basic status of the construction machinery to determine the overall status of the construction machinery by giving a preset weight to each of the first factor and the second factor. In an exemplary embodiment, the weight given to the second factor may be higher than the weight given to the first factor. This is because it is possible to check whether the equipment is damaged by the oil or the part that has not been checked in the oil status through the oil property information by using the second factor.

The control unit 150 may determine a notification status by comparing the score of the overall status with a preset threshold level. In an exemplary embodiment, the first threshold level may be based on a score of 2 points in the overall status, and the second threshold level may be based on a score of 3 points in the overall status. In an exemplary embodiment, the control unit 150 may determine the overall status as a normal grade when the score of the overall status is 1 point or less. In addition, when the score of the overall status exceeds 1 point, but does not reach the first threshold level, the control unit 150 may determine the overall status as a caution grade. When the score of the overall status exceeds the first threshold level, for example, when the score is 2 points or more and less than 3 points, the control unit 150 may determine the overall status as a critical grade. When the score of the overall status exceeds the second threshold level, for example, when the score is 3 points or more, the control unit 150 may determine the overall status as an urgent grade.

The control unit 150 may display a notification on the display unit 190 according to the overall status of the equipment determined as described above. That is, when it is determined that the overall status grade is normal, caution, critical, or urgent, the control unit 150 may display the notification for the corresponding level, respectively. In an exemplary embodiment, the control unit 150 may store information about the overall status in the storage unit 170 in the case of the normal grade. In the case of the caution, critical, or urgent grade, the control unit 150 may control the display unit 190 to display a necessary action for each status together with a grade notification.

The display unit 190 may be disposed on one side of the construction machinery to display a notification according to the overall status grade determined by the control unit 150. In addition, the display unit 190 may also display a necessary action for each grade along with the grade notification.

Hereinafter, a method for status diagnosis of construction machinery according to various exemplary embodiments of the present disclosure will be described in detail with reference to FIGS. 5 and 6.

The method for status diagnosis of the construction machinery according to various exemplary embodiments of the present disclosure may include a step (710) of acquiring oil property information and operating status information at a preset cycle by the oil property sensor 111 and the equipment sensor 112. Next, a step (720) of determining a basic status of the construction machinery based on the oil property information acquired by the oil property sensor 111 may be performed by the control unit 150. Thereafter, a step (730) of determining an overall status of the construction machinery by reflecting the operating status information based on the basic status of the construction machinery may be included. When the grade for the overall status is determined by the control unit 150, a notification according to the corresponding grade may be displayed on the display unit 190 (740). In this case, the display unit 190 may also display a necessary action for each grade together with the notification of the grade.

As described above, according to the present disclosure, it is possible to determine an oil status of the construction machinery even without a separate off-line operator action. In addition, it is possible to enhance the accuracy of determination of an abnormal status by combining an oil status of the machinery and an operating status of the machinery to determine the overall status of the construction machinery.

Hereinabove, even if it is described that all of constituent elements constituting the exemplary embodiment of the present disclosure are coupled as a single unit or coupled to be operated as a single unit, the present disclosure is not necessarily limited to the exemplary embodiment. That is, among the components, one or more constituent elements may be selectively coupled to be operated within the scope of the object of the present disclosure. Unless explicitly described to the contrary, since the word "including", "constituting" or "having" implies the inclusion of the corresponding elements, it should be interpreted to mean not the exclusion of any other elements but further inclusion of any other elements. Further, if not contrarily defined, all terms used herein including technological or scientific terms have the same meanings as those generally understood by a person with ordinary skill in the art. A generally used terminology which is defined in a dictionary should be interpreted to be equal to a contextual meaning of the related technology but is not interpreted to have an ideal or excessively formal meaning, if it is not apparently defined in the present disclosure.

The above description just illustrates the technical spirit of the present disclosure and various changes and modifications can be made by those skilled in the art to which the present disclosure pertains without departing from an essential characteristic of the present disclosure. Therefore, the exemplary embodiments of the present disclosure are provided for illustrative purposes only but not intended to limit the technical concept of the present disclosure. The scope of the technical concept of the present disclosure is not limited thereto. The protective scope of the present disclosure should be construed based on the appended claims, and all the technical spirits in the equivalent scope thereof should be construed as falling within the scope of the present disclosure.

From the foregoing, it will be appreciated that various embodiments of the present disclosure have been described herein for purposes of illustration, and that various modifications may be made without departing from the scope and spirit of the present disclosure. Accordingly, the various embodiments disclosed herein are not intended to be limiting, with the true scope and spirit being indicated by the following claims.

What is claimed is:

1. A system for status diagnosis of construction machinery to determine the abnormality of the construction machinery, comprising:
    a sensor unit including at least one or more oil property sensors for detecting oil property information and at least one or more equipment sensors for detecting operating status information of the construction machinery;
    a control unit configured to determine a basic status of the construction machinery through the oil property information and determine an overall status of the construction machinery based on the operating status information of the construction machinery and the basic status of the construction machinery; and
    a display unit configured to display a notification according to the determination of the control unit,
    wherein the operating status information of the construction machinery detected through the equipment sensor includes a first factor including operating time information, operating condition information, and parts maintenance information of the construction machinery and a second factor including operating specification information of the construction machinery by the change in the properties of the oil,
    wherein the basic status of the construction machinery is determined based on kinematic viscosity and permittivity for each temperature section of the oil, and
    wherein the control unit calculates a score for the first factor by summing numeric scores of operating time information, operating condition information, and parts maintenance information of the construction machinery and determines a qualitative grade for the first factor based on the score for the first factor.

2. The system for status diagnosis of the construction machinery of claim 1, wherein the control unit determines the overall status of the construction machinery by giving a preset weight to each of the first factor and the second factor.

3. The system for status diagnosis of the construction machinery of claim 2, wherein the weight given to the second factor is higher than the weight given to the first factor.

4. The system for status diagnosis of the construction machinery of claim 1, wherein the oil property sensor acquires the oil property information at a preset cycle, and the second factor is acquired at the same cycle as the cycle at which the oil property information is acquired.

5. The system for status diagnosis of the construction machinery of claim 1, wherein the control unit determines a notification status by comparing a score of the overall status with a preset threshold level.

6. A method for status diagnosis of construction machinery to determine abnormality of the construction machinery, comprising steps of:
    acquiring oil property information and operating status information of the construction machinery at a preset cycle;
    determining a basic status of the construction machinery based on the oil property information;
    determining an overall status of the construction machinery by a control unit of the construction machinery based on the operating status information of the construction machinery and the basic status of the construction machinery; and
    displaying a notification according to the overall status of the construction machinery,
    wherein the operating status information includes a first factor including operating time information, operating condition information, and parts maintenance information of the construction machinery and a second factor including operating specification information of the construction machinery by the change in the properties of the oil,
    wherein the basic status of the construction machinery is determined based on kinematic viscosity and permittivity for each temperature section of the oil, and
    wherein a control unit of the construction machinery calculates a score for the first factor by summing numeric scores of operating time information, operating condition information, and parts maintenance information of the construction machinery and determines a qualitative grade for the first factor based on the score for the first factor.

7. The method for status diagnosis of the construction machinery of claim 6, wherein the overall status of the construction machinery is determined by giving a preset weight to the first factor and the second factor, respectively.

8. The method for status diagnosis of the construction machinery of claim 6, wherein the control unit determines a notification status by comparing a score of the overall status with a preset threshold level.

* * * * *